United States Patent
Jung et al.

(10) Patent No.: US 8,085,357 B2
(45) Date of Patent: Dec. 27, 2011

(54) LIQUID CRYSTAL DISPLAY

(75) Inventors: Younhwan Jung, Yongin-si (KR); Wonki Cho, Yongin-si (KR); Jeongmin Park, Yongin-si (KR); Woonbo Yeo, Yongin-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 905 days.

(21) Appl. No.: 12/051,757

(22) Filed: Mar. 19, 2008

(65) Prior Publication Data

US 2008/0273137 A1    Nov. 6, 2008

(30) Foreign Application Priority Data

May 4, 2007    (KR) ........................ 10-2007-0043703

(51) Int. Cl.
*G02F 1/1333*    (2006.01)
(52) U.S. Cl. ................ 349/58; 349/59; 349/60
(58) Field of Classification Search ............. 349/58–60
See application file for complete search history.

(56) References Cited

U.S. PATENT DOCUMENTS

| | | | | |
|---|---|---|---|---|
| 6,741,299 | B2 * | 5/2004 | Fukayama et al. | 349/58 |
| 7,515,220 | B2 * | 4/2009 | Ko et al. | 349/58 |
| 7,586,556 | B2 * | 9/2009 | You et al. | 349/58 |
| 2004/0090567 | A1 | 5/2004 | Lee et al. | |
| 2004/0114372 | A1 * | 6/2004 | Han et al. | 362/330 |
| 2005/0280750 | A1 | 12/2005 | Cho et al. | |
| 2007/0109462 | A1 | 5/2007 | Lee et al. | |
| 2007/0126335 | A1 | 6/2007 | You et al. | |

FOREIGN PATENT DOCUMENTS

| | | |
|---|---|---|
| JP | 2004-104545 | 4/2004 |
| KR | 2000-0009873 | 2/2000 |
| KR | 10-2005-0121006 | 12/2005 |
| KR | 10-2006-0028625 | 3/2006 |
| KR | 10-2006-0085011 | 7/2006 |
| KR | 10-2007-0021073 | 2/2007 |
| KR | 10-2007-0044136 | 4/2007 |

OTHER PUBLICATIONS

Patent Abstracts of Japan, Publication No. 2004-104545, dated Apr. 2, 2004, in the name of Kazuhiro Takeuchi.
Korean Patent Abstracts, Publication No. 1020000009873 A, dated Feb. 15, 2000, in the name of Ik Hwan Lee.
Korean Patent Abstracts, Publication No. 1020050121006 A, dated Dec. 26, 2005, in the name of Jin Woo Cho et al.

(Continued)

*Primary Examiner* — Mark Robinson
*Assistant Examiner* — Charles Chang
(74) *Attorney, Agent, or Firm* — Christie, Parker & Hale, LLP (57) ABSTRACT

A liquid crystal display includes a liquid crystal display panel, a back light unit attached to the liquid crystal display panel having a light source and a light guide plate, a mold frame attached to the back light unit, and a bezel within the mold frame for supporting the mold frame. The bezel includes a first seat having a base and a first side wall extending from a perimeter of the base, and a second seat having a step extending from the first side wall and a second side extending from a perimeter of the step.

18 Claims, 11 Drawing Sheets

OTHER PUBLICATIONS

Korean Patent Abstracts, Publication No. 1020060028625 A, dated Mar. 30, 2006, in the name of Dong Nyuck Park.

Korean Patent Abstracts, Publication No. 1020060085011 A, dated Jul. 26, 2006, in the name of Sang Hoon Park et al.

Korean Patent Abstracts, Publication No. 1020070021073 A, dated Feb. 22, 2007, in the name of Naohito Toyomaki.

Korean Patent Abstracts, Publication No. 1020070044136 A, dated Apr. 27, 2007, in the name of Kyoung Don Lee.

U.S. Office action dated Feb. 25, 2010, for related U.S. Appl. No. 12/051,760.

* cited by examiner

FIG. 13f

LIQUID CRYSTAL DISPLAY

CLAIM FOR PRIORITY

This application claims priority to and the benefit of Korean Patent Application No. 10-2007-0043703, filed on May 4, 2007, in the Korean Intellectual Property Office (KIPO), the entire content of which is hereby incorporated by reference.

BACKGROUND

1. Field of the Invention

The present invention relates to a liquid crystal display, and more particularly, to a liquid crystal display having increased structural integrity.

2. Description of the Related Art

A liquid crystal display (LCD) is one of various flat panel display (FPD) devices that display images using liquid crystal. Because the LCD is thin, lightweight, and has low drive voltage and low power consumption as compared to other display devices, LCDs have been widely used in every industrial field.

The LCD includes a thin film transistor (TFT) substrate, a color filter facing to the thin film transistor substrate and a liquid crystal display panel having liquid crystals between the two substrates that change its optical transmission efficiency by applying an electrical signal.

The liquid crystal display panel requires a light source that provides lights having brightness higher than a threshold level to the liquid crystal display panel for displaying images because the liquid crystal does not emit light itself.

Recently, a back light unit using a light emitting diode (LED) has been used as the light source. The back light unit includes a light guide plate for collecting light generated from the light emitting diode as a light source to the liquid display panel, and optical sheets that make the light emitted from the light guide plate uniform and convert a progress path of the light so as to obtain optimum brightness. The light guide plate and the optical sheets are stacked from top to bottom in the back light unit. The liquid crystal display panel and the back light unit are generally supported by a mold frame and a bezel.

The liquid crystal display panel and the back light unit are assembled to be attached to a resin mold frame made by a hook method. A metal bezel surrounds a periphery of the mold frame to maintain the strength of the mold frame. The mold frame and bezel structure has become smaller as devices such as cellular phones, Portable Multimedia Players (PMP), and digital cameras have become thinner and more lightweight.

However, there are limitations to miniaturization of the mold frame and bezel structure. For example, if the bezel becomes too thin, the structural integrity is weakened, thereby being easily deformed by torsion force caused by external impact. Accordingly, the mold frame may deform, thereby damaging the back light unit and the liquid crystal display.

SUMMARY

An aspect of an embodiment of the present invention is directed toward a liquid crystal display that can improve torsion strength by including a bezel formed by a double drawing process.

In an embodiment of the present invention, a liquid crystal display is provided to include a liquid crystal display panel, a back light unit attached to the liquid crystal display panel having a light source and a light guide plate, a mold frame attached to the back light unit, and a bezel within the mold frame for supporting the mold frame. The bezel includes a first seat having a base extending in a first direction and a first side wall extending from a perimeter of the base in a second direction substantially perpendicular to a first direction, and a second seat having a step extending from the first side wall in a third direction substantially parallel to the first direction and a second side extending from a perimeter of the step in a fourth direction substantially perpendicular to the third direction.

In one exemplary embodiment, the mold frame is seated within the first seat and the first side wall surrounds a lateral surface of the mold frame. The liquid crystal display panel may be seated in the second seat, and the second side wall may surround a lateral surface of the liquid crystal display panel. The mold frame may include a mold frame rib extending along the second side wall and the step. The first seat may further include a flange extending along one side edge of the base of the mold frame.

In one exemplary embodiment, the mold frame further includes a mold frame insert extending along an exterior edge of the step and the second side wall, wherein an exposed edge of the mold frame insert is aligned with the base and another exposed edge of the mold frame insert is aligned with the second side wall.

BRIEF DESCRIPTION OF THE DRAWINGS

FIG. 8b is a sectional schematic of a light guide plate and an LCD panel seated in the combined structure of FIG. 8a.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Figure 1:
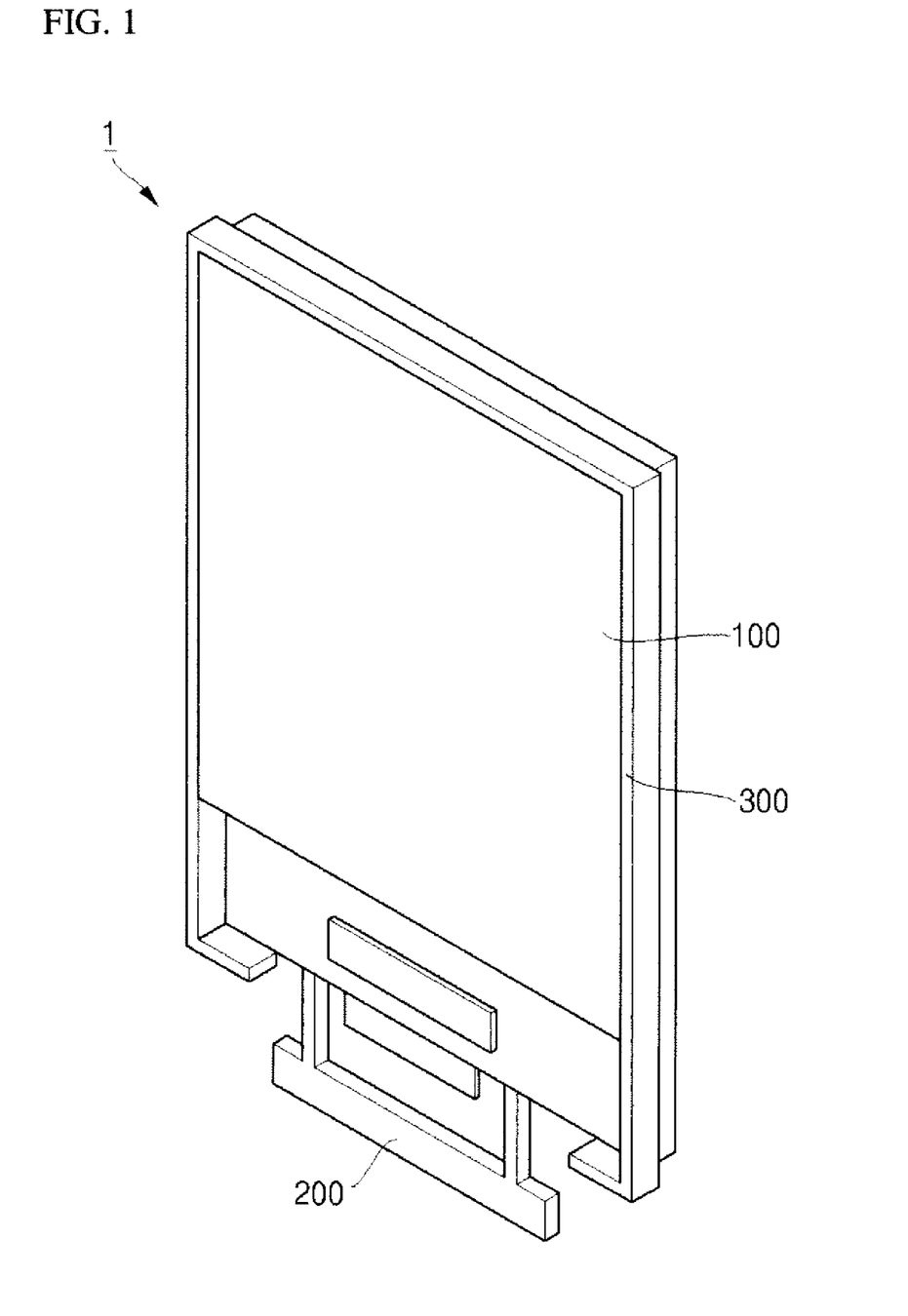
FIG. 1 is a combined schematic of a liquid crystal display (LCD) according to an exemplary embodiment of the present invention.
Figure 2:
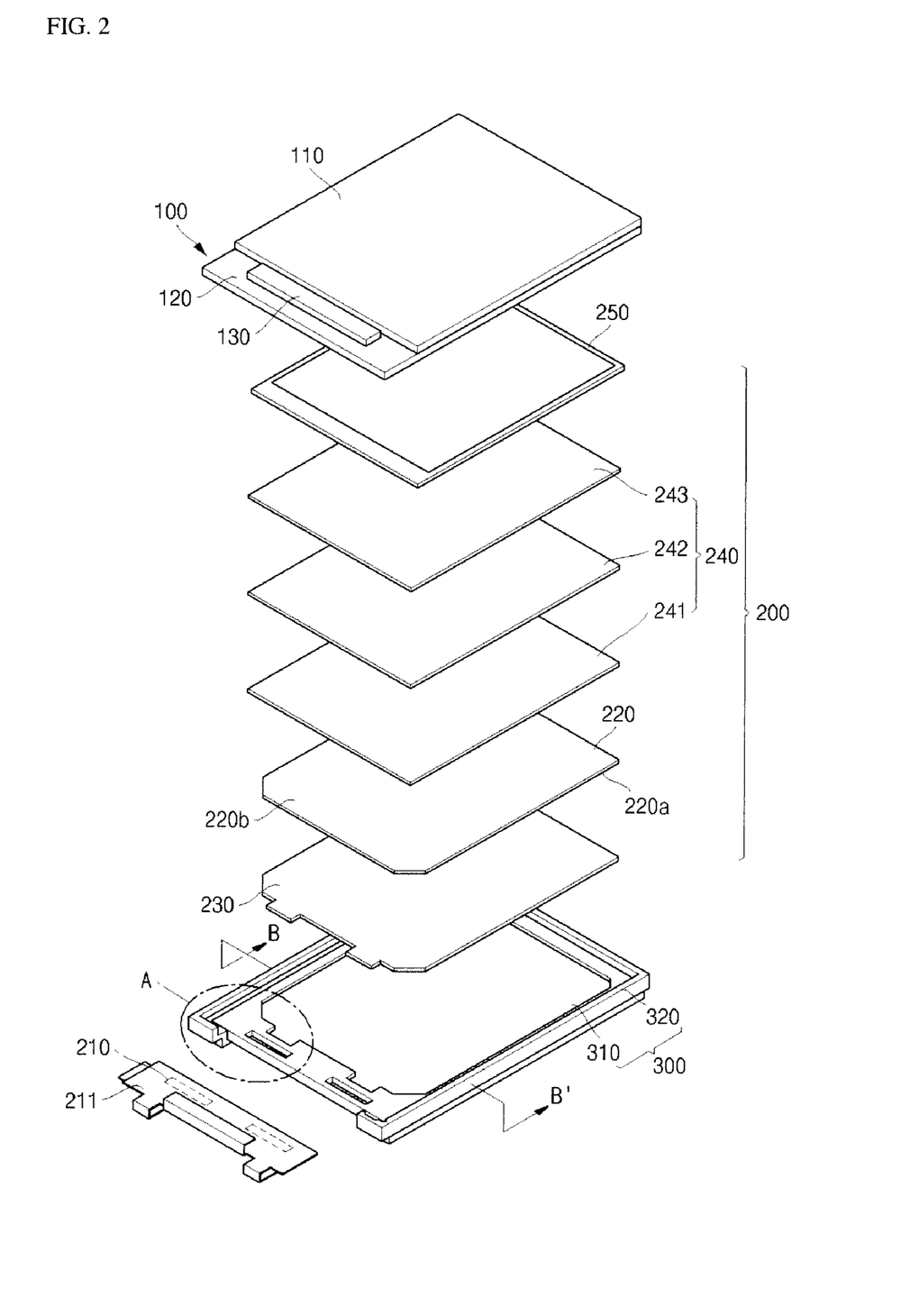
FIG. 2 is an exploded perspective schematic of the LCD of FIG. 1.

Referring to FIGS. 1 and 2, an LCD 1 includes a liquid crystal panel 100, a back light unit 200 and a frame structure 300. The frame structure 300 includes a mold frame 310 and a bezel 320. The bezel 320 may be processed by double drawing to have a stepped configuration, and then inserted into the mold frame 310.

The liquid crystal panel 100 includes a liquid crystal between two substrates 110, 120 facing each other, an electrode for driving the liquid crystal, and a polarizing plate arranged on at least one of the two substrates 110, 120. A drive chip 130 for driving the liquid crystal panel 100 is installed on one side of a lower substrate 120. Information is displayed on a screen of the liquid crystal panel 100 and the liquid crystal panel 100 can be seated within the frame structure 300. In accordance with exemplary embodiments of the present invention, the liquid crystal panel 100 may be used, as will be appreciated by one of ordinary skill in the art.

The back light unit 200 may be located on a back surface of the liquid crystal display panel 100 for providing light required for displaying information on the liquid crystal display panel 100. In one exemplary embodiment, the back light unit 200 may include a light source 210, a light guide plate 220, a reflection sheet 230, and an optical sheet 240.

The light source 210 is arranged at the back surface of the liquid crystal display panel 100 and may be installed in a printed circuit board (PCB) 211 to be electrically coupled to the liquid crystal display panel 100. For example, a light emitting diode (LED) may be used as the light source 210. The light source 210 provides the liquid crystal display panel 100 with light for displaying image information on the liquid crystal display panel 100. The PCB 211 electrically coupled to the light source 210 may be composed of flexible material to allow easy installation onto the liquid crystal display and may include a plurality of drive chips for driving the light source 210.

The light guide plate 220 is located between the light source 210 and the liquid crystal display panel 100 to convert a point light source from the light source 210 to a surface light source. The incident light from the light source 210 is scattered onto the back surface 220a of the light guide plate 220 and travels to the liquid crystal display panel 100. The light guide plate 220 may be composed of a high tensile strength material having a high light transmission efficiency, for example, poly methyl methacrylate (PMMA). The light guide plate 220 is attached to the frame structure 300 as described in more detail below and fixed by the frame structure 300. The reflection sheet 230 may be located on the back surface 220a of the light guide plate 220 to reduce the light to be transmitted to the liquid crystal display panel 100 from leaking out of the back surface 220a of the light guide plate 220. Further, various optical sheets 240 may be located on a front surface 220b of the light guide plate 220 to improve light transmission efficiency of the liquid crystal display panel 100.

The reflection sheet 230 may be arranged at the back surface 200a of the light guide plate 220 so as to be seated in the frame structure 300, and more particularly, in the mold frame 310. As described above, the reflection sheet 230 enables light to be reflected back to the light guide plate 220. The reflection sheet 230 may be made of polyethylene terephthalate (PET) and/or polycarbonate (PC). As one of ordinary skill in the art will appreciate, other suitable material having high reflectivity may be used instead or in addition.

The optical sheet 240 may include a diffusion sheet 241 for scattering light and uniformly transferring light to the LCD panel, and a prism sheet 242 for enhancing the brightness of the light by focusing the light dispersed by the light guide plate 220 and the diffusion sheet 241 on the LCD panel. The back light unit 200 may further include a protection sheet 243 for protecting the optical sheet 240 from being damaged by external impact or dust.

The back light unit 200 may further include a light shielding tape 250 for preventing light from leaking out to a part where image information is not displayed on the liquid crystal display panel 100. The light shielding tape 250 may be between the optical sheet 240 and the liquid crystal display panel 100, and more particularly, on an edge of the back light unit 200 where image information is not displayed.

The frame structure 300 may include the mold frame 310 on which the light source 210 and light guide plate 220 are inserted and fixed (or attached) and the bezel 320 inserted into the mold frame 310 to support the mold frame 310. The frame structure 300 provides space for installing the LCD panel 100 and the back light unit 200 thereon. Further, the frame structure 300 supports the liquid crystal display panel 100 and the back light unit 200 to prevent (or reduce) the liquid crystal display 100 from being damaged by external impact or vibration.

With reference now to FIGS. 3-6, the mold frame 310 according to embodiments of the present invention includes a substantially rectangular shape into which the light source 210 and the light guide plate 220 can be inserted. More particularly, the mold frame 310 may include a light source holder 311 for attachment of the light source 210 and a light guide plate holder 312 for attachment of the light guide plate 220. The mold frame 310 may further include a plurality of drive chip holders 313, 314 configured to fix a plurality of drive chips on the printed circuit board 211 for driving the light source 210. The light source holder 311, the light guide plate holder 312, and the drive chip holders 313, 314 may be modified based on the types of light source 210 and light guide plate 220 seated in the mold frame 310, but are not limited to the ones specifically described herein.

The mold frame 310 may be composed of a synthetic resin and may be integral with the bezel 320 and, for example, formed by injection molding. In one exemplary embodiment, the mold frame 310 may have a thickness t1 ranging from about 0.3 mm to about 1.0 mm (or from 0.3 mm to 1.0 mm). If the thickness t1 of the mold frame 310 is less than 0.3 mm, molding the mold frame 310 and inserting and supporting the light source 210 and the light guide plate 220 therein are difficult. If the thickness t1 of the mold frame 310 is greater than 1.0 mm, the LCD is too thick.

In one exemplary embodiment, the bezel 320 includes a first seat 321 for seating the light guide plate 220 and the mold frame 310, and a second seat 322 for seating the liquid crystal display panel 100. The first seat 321 and the second seat 322 may be formed by double drawing.

The first seat 321 may include a substantially flat base 321a and a first side wall 321b extending from a perimeter of the base 321a. In one exemplary embodiment, the base 321a is substantially rectangular and supports the light guide plate 220 and the mold frame 310. The first side wall 321b surrounds a lateral surface 310a of the mold frame 310 for seating the mold frame 310. The first side wall 321b may have a height h1 substantially corresponding to the thickness t1 of the mold frame 310. More particularly, the first side wall 321b may be equal to or slightly higher than the thickness t1 of the mold frame 310 so that the mold frame 310 does not protrude from the first side wall 321b.

Figure 6:
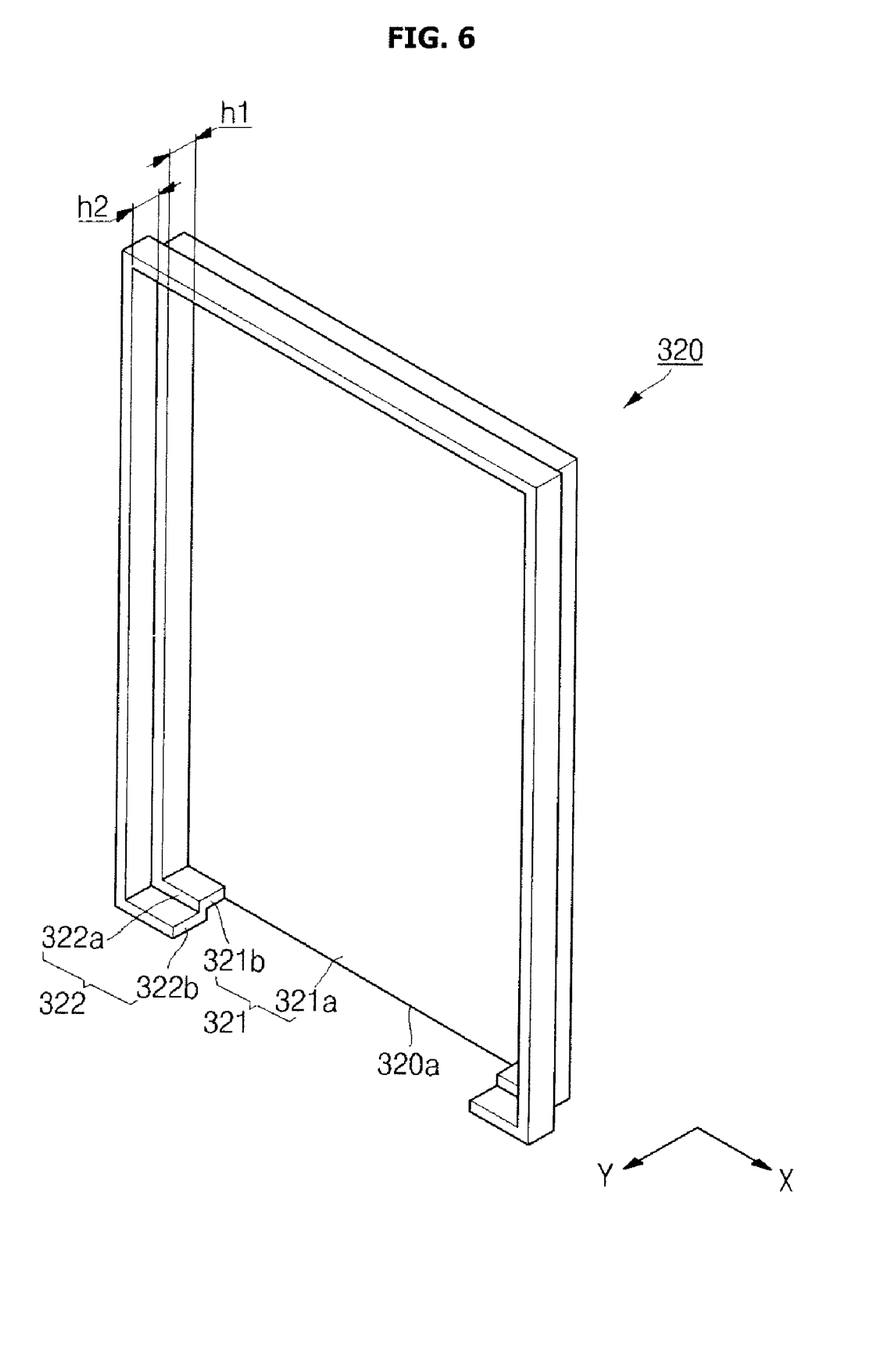
FIG. 6 is a perspective schematic of a bezel according to yet another exemplary embodiment of the present invention.

The first side wall 321b may be continuous around three sides of the bezel and extend partially along a fourth side, as shown in FIG. 6, to allow for placement of the light source 210. Alternatively, the first side wall may be continuous around the entire perimeter of the base 321a if necessary to accommodate the back light unit 200.

Figure 3:
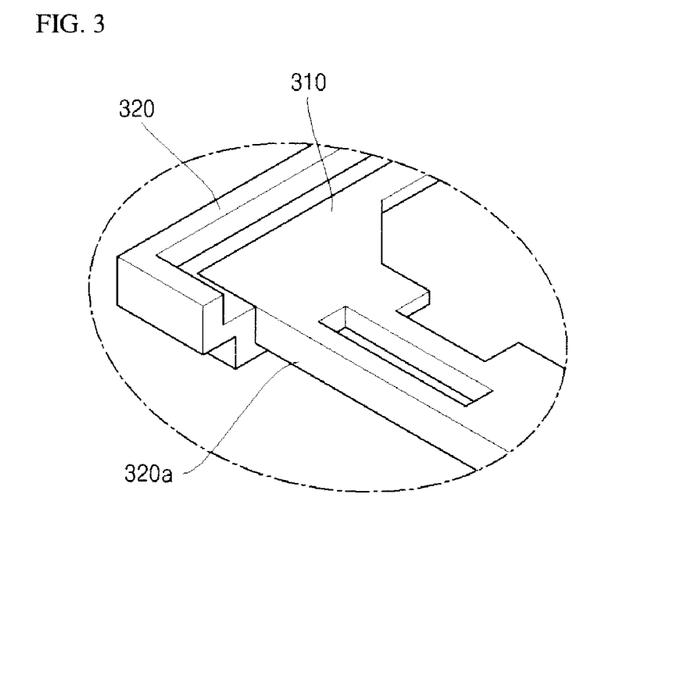
FIG. 3 is a partial perspective detail schematic of region "A" of the LCD of FIG. 2.
Figure 4:
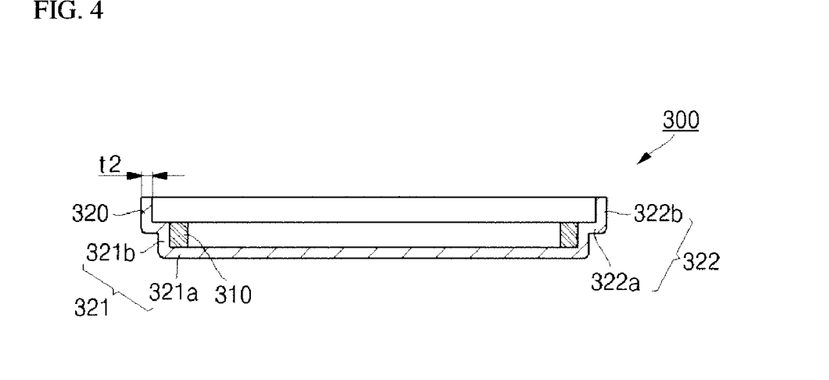
FIG. 4 is a sectional schematic of a frame structure taken along B-B' line of FIG. 2.
Figure 5:
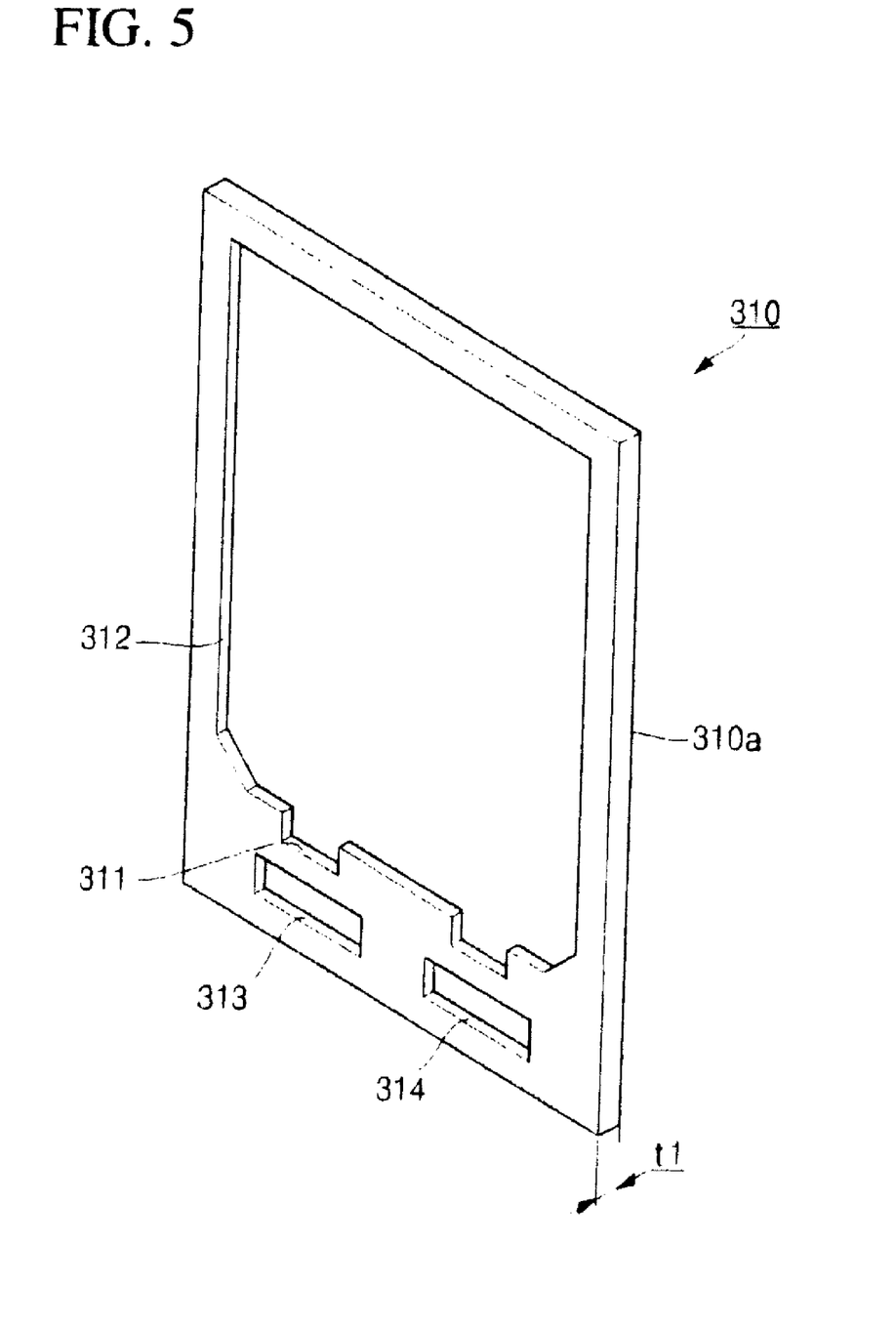
FIG. 5 is a perspective schematic of a mold frame according to another exemplary embodiment of the present invention.

The second seat 322 may having a stepped configuration including a step 322a extending outwardly from the first side wall 321b and a second side wall 322b extending perpendicularly from the step 322a. The step 322a supports the liquid crystal display panel 100, and the second side wall 322b encompasses the lateral surface of the LCD panel 100. The second side wall 322b has a height h2 substantially corresponding to the thickness of the LCD panel 100.

The step 322a and second side wall 322b may be configured to substantially match the first seat 321. In other words, the step 322a and the second side wall 322b may be continuous around three sides of the perimeter of the base 320a and partially extend along a fourth side, as shown in FIG. 6.

In one exemplary embodiment, the bezel 320 has a thickness ranging from about 0.1 mm to about 0.3 mm. If the thickness t2 of the bezel 320 is less than 0.1 mm, supporting the mold frame 310 is difficult because the structural integrity of the bezel 320 is weak. On the other hand, if the thickness t2 of the bezel 320 is greater than 0.3 mm, the LCD may be too thick and/or heavy.

The bezel 320 may be composed of a relatively rigid (and/or stiff) material for supporting not only the mold frame 310, but also for supporting the light source 210, the light guide plate 220 and the LCD panel 100. As a result, the bezel 320 protects those elements from impact and/or vibration.

The frame structure 300 may be formed by injection-molding the bezel 320 using a double drawing process and combining the bezel 320 with the mold frame 310. Here, the double drawing process refers to drawing sequentially, using uniquely-sized dies, as described in more detail below. More specifically, the bezel 320 may be formed by processing a metal plate through primary drawing with a relatively large die and processing the metal plate through secondary drawing with a smaller die.

According to one exemplary embodiment of the present invention, the strength of the frame structure 300 and the LCD 1 is improved by double drawing the bezel 320. Because the bezel 320 integrally includes the base 321a, the first side wall 321b, the step 322a and the second side wall 322b, the bezel 320 is not easily deformed by impact or vibration and can maintain its shape. Further, due to its relatively large width, the torsion strength of the bezel 320 is enhanced.

Referring to FIGS. 7 to 10, other exemplary embodiments of the present invention are provided, and differences between the present embodiments and the previous embodiments will be described in more detail. With reference to the figures, a frame structure 1300 includes a bezel 1320, a mold frame 1310 encompassed in a first seat 1321, and a second seat 1322 of the bezel 1320.

Figure 7:
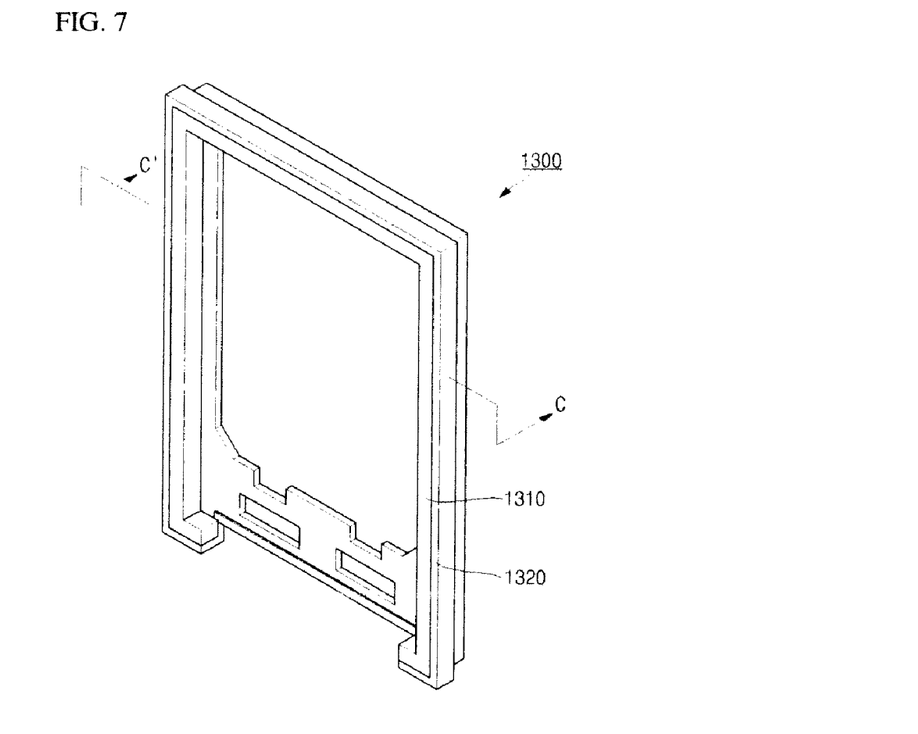
FIG. 7 is a perspective schematic of a mold frame and a bezel according to yet another exemplary embodiment of the present invention.
Figure 9:
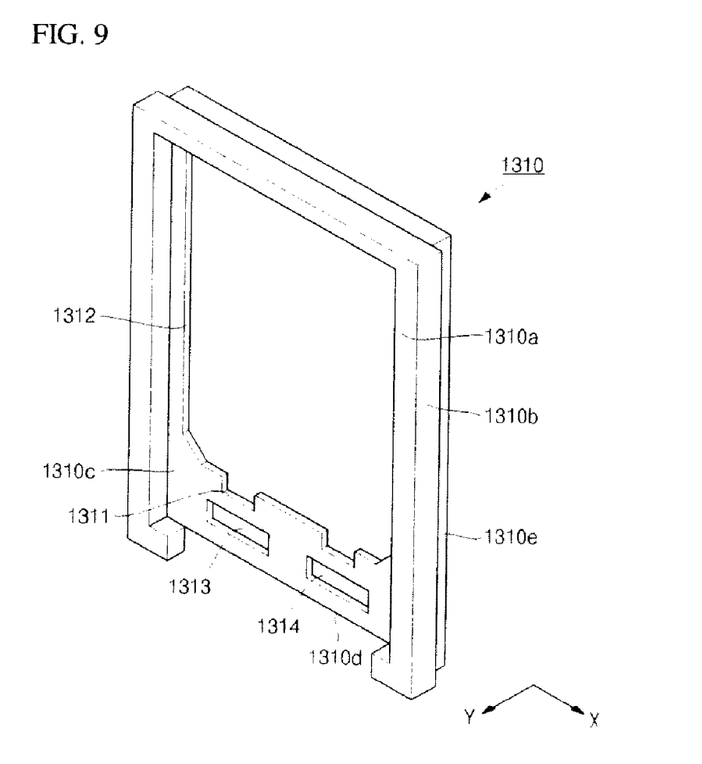
FIG. 9 is a perspective schematic of the mold frame according to another exemplary embodiment of the present invention.

The mold frame 1310 includes a mold frame base 1310a having a substantially rectangular shape on which the light source 210 (FIG. 2) and the light guide plate 1220 can be inserted, and a mold frame rib 1310b extending adjacent a second side wall 1322a, as described in more detail below.

The mold frame base 1310a further includes a light source holder 1311, a light guide plate holder 1312, and drive chip holders 1313, 1314 that are configured to be compatibly arranged with the mold frame base. One of ordinary skill in the art will appreciate that the light source holder 1311, the light guide plate holder 1312, and drive chip holders 1313, 1314 can have various suitable shapes, as is well known in the art. An LCD panel 1100 may be located on an upper surface of the mold frame base mold frame 1310a.

The mold frame rib 1310b is seated in the second seat 1322 of the bezel 1320. The mold frame rib 1310b extends continuously around a perimeter of the mold frame base 1310a except along portion 1310d where the light source is assembled. The mold frame rib 1310b surrounds sides 1100a of the LCD panel 1100 to fix the LCD panel 1100.

Figure 8A:
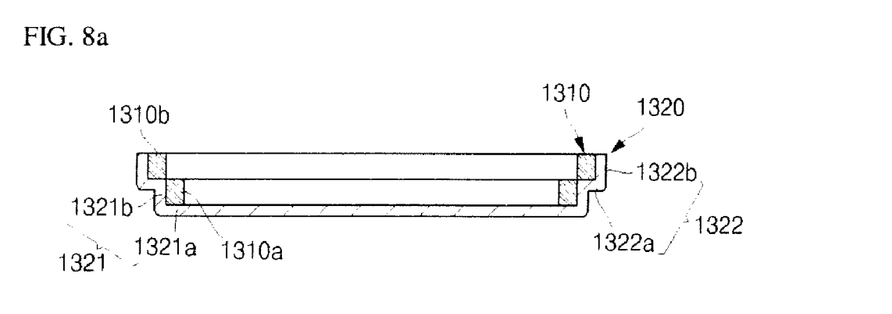
FIG. 8a is a sectional schematic taken along C-C' line of FIG. 7.
Figure 10:
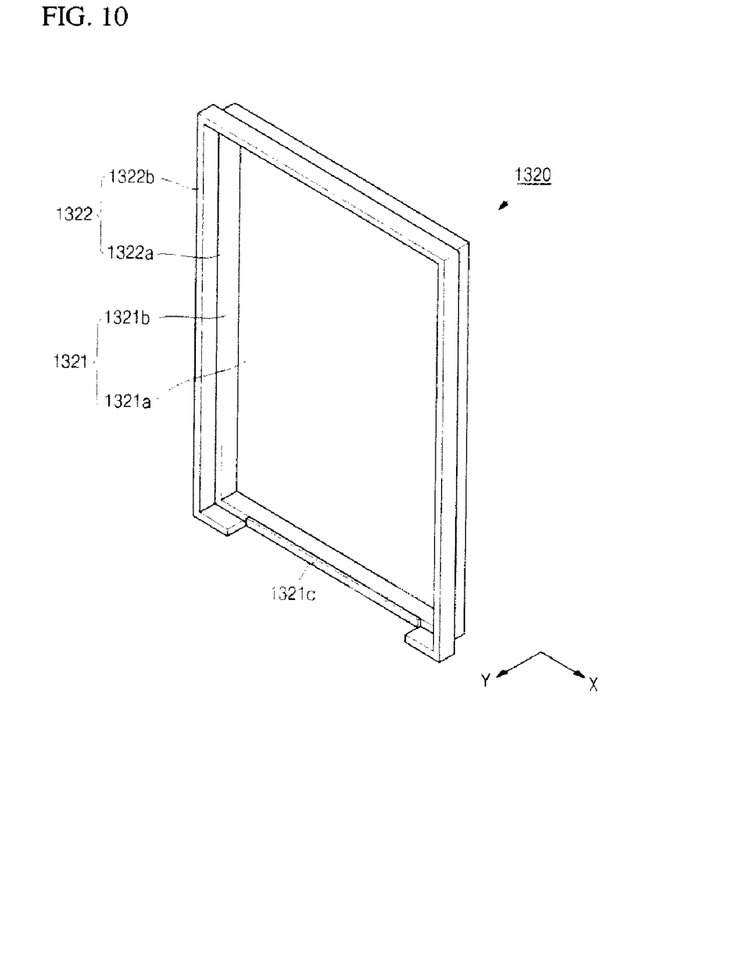
FIG. 10 is a perspective schematic of the bezel according to another exemplary embodiment of the present invention.

The bezel 1320 may include a first seat 1321 and a second seat 1322 for seating the mold frame 1310. The first seat 1321 includes a substantially flat base 1321a, a first side wall 1321b extending substantially in a perpendicular direction from a perimeter of the base 1321a, and a flange 1321c extending along a lateral surface 1320a of the base 1321a for reinforcing the frame structure. The mold frame base 1310a is seated in the base 1321a and insert-injected to fix the light guide plate 1220 therein. Additionally, the first side wall 1321b surrounds a lateral surface 1310e of the mold frame 1310.

The second seat 1322 includes a step 1322a extending substantially perpendicularly from the first side wall 1321b and a second side wall 1322b extending substantially perpendicularly from the step 1322a. The mold frame rib 1310b is seated in the second seat 1322 and insert-injected therein. The first side wall 1321b surrounds a circumference of the mold frame rib mold frame 1310b.

Figure 8B:
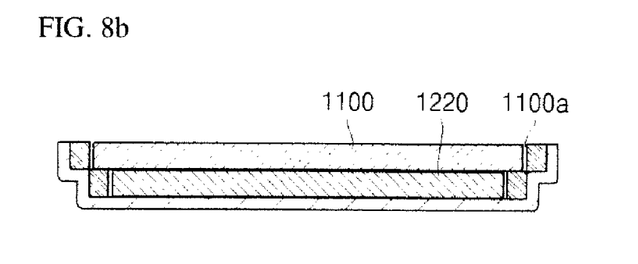

According to another exemplary embodiment, the mold frame rib 1310b surrounds the LCD panel 1100 and acts as a shock absorber to protect the LCD panel 1100 from impact or vibration. Accordingly, the strength of the LCD can be more improved.

Figure 11:
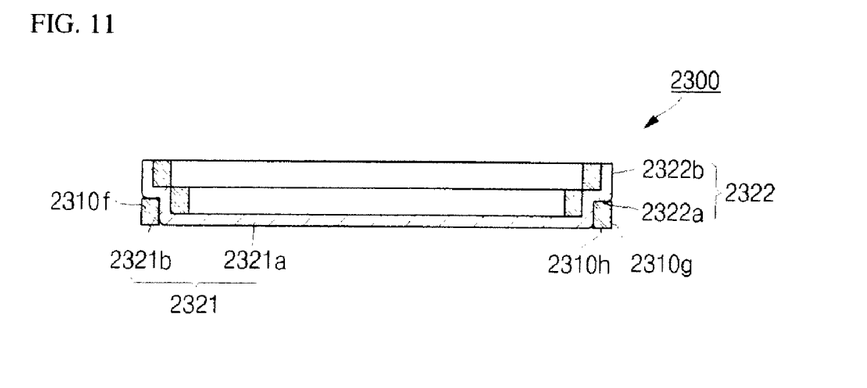
FIG. 11 is a sectional schematic of the frame structure according to still another exemplary embodiment of the present invention.

With reference to FIG. 11, another exemplary embodiment is provided similar to the previous embodiments, and therefore, only the differences will be described in more detail. As shown in FIG. 11, a frame structure 2300 includes a mold frame 2310 having a mold frame base 1310a, a mold frame rib 1310b and a mold frame insert 2310f, and a bezel 2320 including a first seat 2321 and a second seat 2322 formed by a double drawing process. The first seat 2321 may include a first seat base 2321a and a first seat side wall 2321b, and the second seat 2322 may include a second seat step 2322a and a second seat side wall 2322b.

The mold frame insert 2310f is insertable into a space between the outside of the first seat side wall 2321b and the second seat step 2321a. Two externally exposed edges 2310g, 2310h of the mold frame insert 2310f are substantially aligned with the second side wall 2322b and the base 2321a, respectively. Accordingly, the mold frame 2310 and the bezel 2320 can be more easily insert-injected because the bezel 2320 can be inserted into the mold frame 2310 without a separate assembly hole.

As such, a liquid crystal display according to embodiments of the present invention have improved strength and resistance to external torsion force because a bezel insert-injected into the mold frame is processed by double drawing. The bezel may not be insert-injected into the mold frame and may be used instead of the frame structure by itself.

Figure 12:
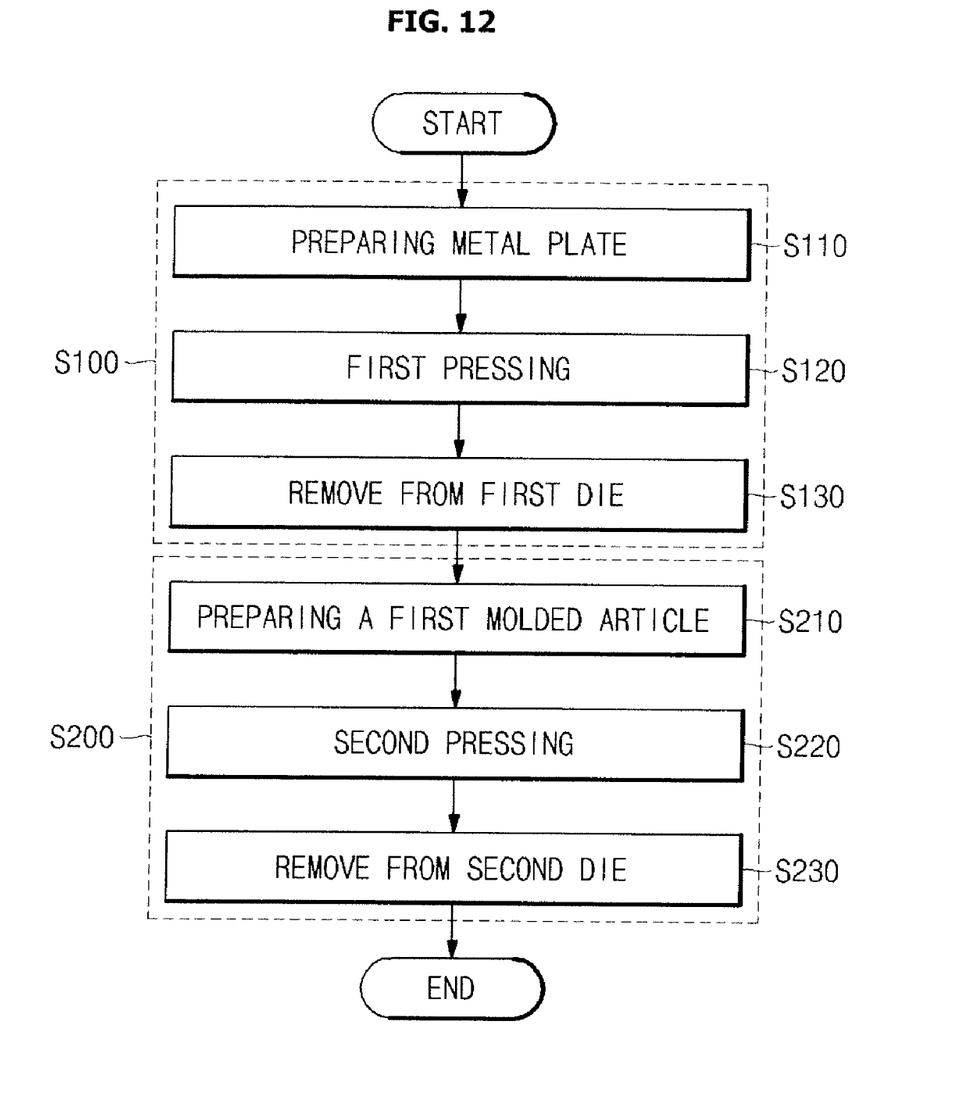
FIG. 12 is a flow chart of a method of producing the bezel according to an exemplary embodiment of the present invention.

An exemplary method of manufacturing the bezel 320 is described below with reference to FIGS. 12 and 13a-13f. Referring to FIG. 12, the method of producing the bezel 320 includes a first drawing process (S100) and a second drawing process (S200). The first drawing process (S100) includes preparing a metal plate (S110), a first pressing process (S120), and a first punching process (S130). The process S200 includes preparing a first molded article (S210), a second pressing process (S220), and a second punching process (S230).

Figure 13A:
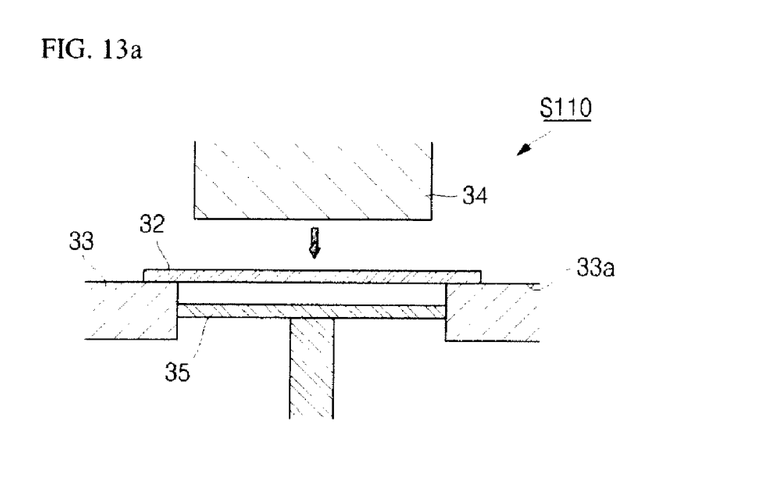
FIGS. 13a, 13b, 13c, 13d, 13e, and 13f are sectional schematics of the method steps according to the flow chart of FIG. 12.

Referring to FIG. 13a, illustrating step S110, a metal plate 32 provided as a base material of the bezel 320 is placed on an upper surface 33a of a first die 33. A first punch 34 may be aligned over an upper surface 32a of the metal plate 32 for molding the metal plate 32 into the first die 33. A knock out unit 35 is located inside the first die 33 for removing the metal plate 32 after the metal plate 32 has been molded.

Figure 13B:
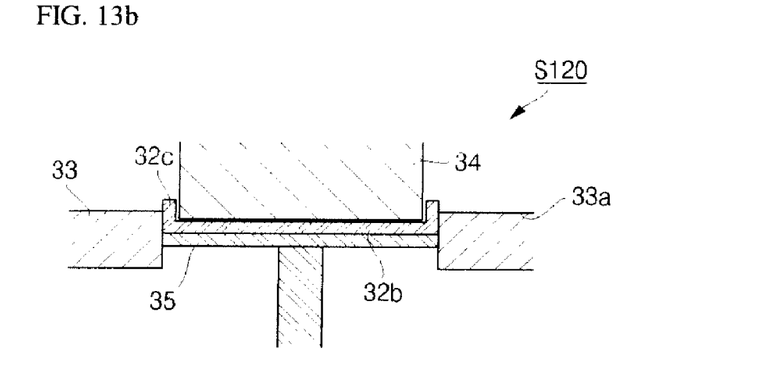

Referring to FIG. 13b, illustrating step S120, the metal plate 32 is pressed or punched into the first die 33 by the first punch 34 to form a certain shape. Accordingly, the metal plate 32 forms a first molded article 32' (FIG. 13c) including a base 32b and an edge 32c having shape substantially corresponding to the first punch 34.

Figure 13C:
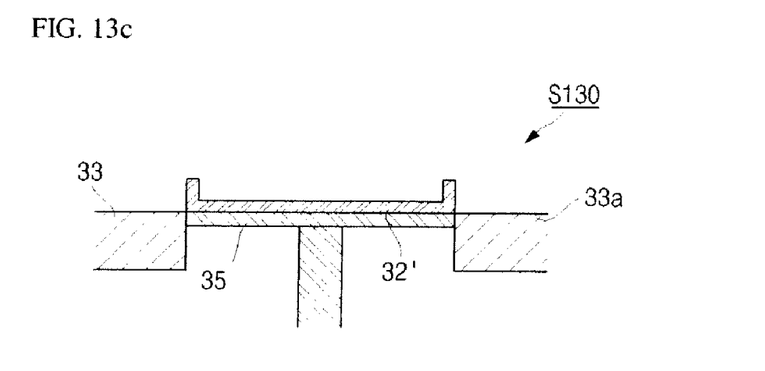
Figure 13D:
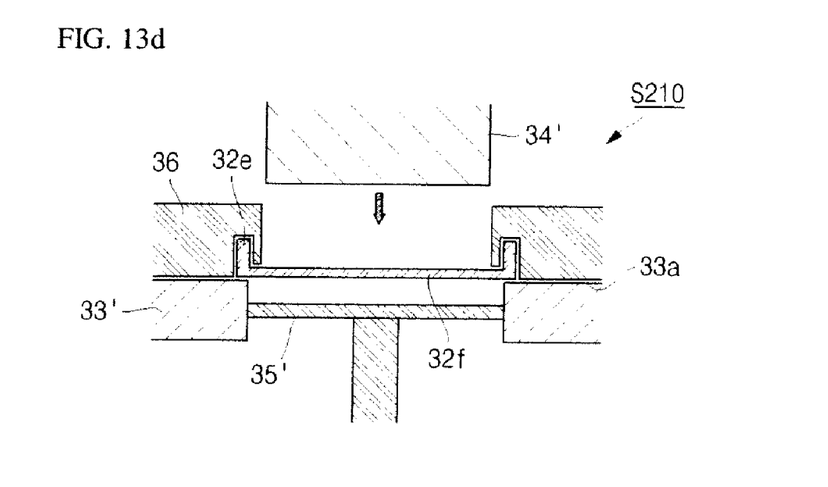
Figure 13E:
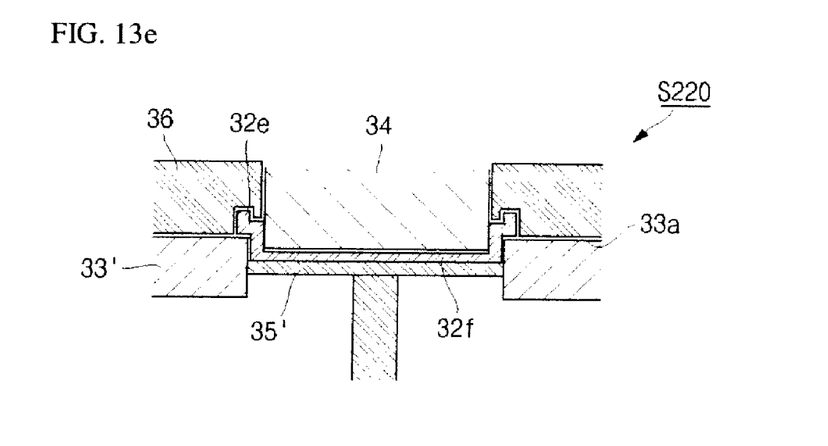
Figure 13F:
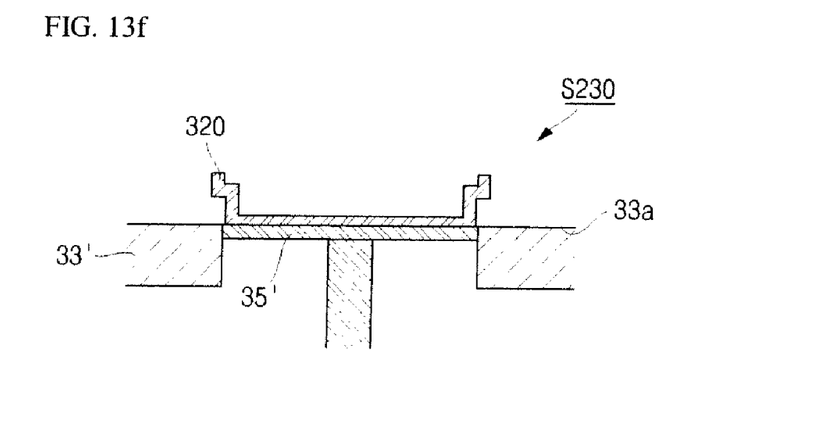

Referring to FIG. 13c, illustrating step S130, the first molded article 32' is lifted by a knock out unit 35. Next, referring to FIG. 13d, illustrating step S210, the first molded article 32' is placed on an upper surface 33a of a second die 33' having a smaller opening than the first die 33. A second punch 34' may be aligned above an upper surface 32f of the first molded article 32' for punching the first molded article 32' into the second die 33'. The first molded article 32' may be fixed by a holder 36 corresponding to and surrounding the edges 32e of the molded article 32', the holder preventing (or protecting) the molded article from being unnecessarily or undesirably deformed and may be formed in the shape corresponding to a side 32e of the first molded article 32' so as to surround the side surface 32e. A knock out unit 35' may be located inside the second die 33' to lift the first molded article 32' after it has been molded. Referring to FIG. 13e, illustrating the step S220, the bezel 320 is formed by the same method as illustrated in step S120 (FIG. 13b). Finally, referring to FIG. 13f, illustrating step S230, the bezel 320 is lifted from the second die 33' to be removed therefrom.

As such, according to an embodiment of the present insert, a bezel having improved strength and resistance to external torsion force can be formed through first and second drawing processes.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A liquid crystal display comprising:
    a liquid crystal display panel;
    a back light unit on a side of the liquid crystal display panel, and comprising a light source and a light guide plate;
    a mold frame on the back light unit; and
    a bezel within the mold frame for supporting the mold frame, the bezel comprising:
        a first seat comprising a base extending in a first direction and a first side wall extending from a perimeter of the base in a second direction substantially perpendicular to the first direction, wherein a height of the first side wall is equal to or greater than a height of the mold frame; and
        a second seat comprising a step extending from the first side wall in a third direction substantially parallel to the first direction and a second side extending from a perimeter of the step in a fourth direction substantially perpendicular to the third direction.

2. The liquid crystal display of claim 1, wherein the mold frame is seated within the first seat, and wherein the first side wall surrounds a lateral surface of the mold frame.

3. The liquid crystal display of claim 1, wherein the liquid crystal display panel is seated within the second seat, and wherein the second side wall surrounds a lateral surface of the liquid crystal display panel.

4. The liquid crystal display of claim 1, wherein the mold frame comprises a mold frame rib adjacent to and extending along the second side wall and the step.

5. The liquid crystal display of claim 4, wherein the liquid crystal display panel is seated in the mold frame, and the mold frame rib surrounds a lateral surface of the liquid crystal display panel.

6. The liquid crystal display of claim 4, wherein the mold frame rib does not extend along an edge of the mold frame on which the light source is located.

7. The liquid crystal display of claim 6, wherein the first seat further comprises a flange extending along one side edge of the base of the mold frame.

8. The liquid crystal display of claim 2, wherein the mold frame further comprises a mold frame insert extending along an exterior edge of the step and the second side wall, wherein an exposed edge of the mold frame insert is aligned with the base, and wherein another exposed edge of the mold frame insert is aligned with the second side wall.

9. The liquid crystal display of claim 1, wherein the first side wall, the step, and the second side wall extend continuously along the base, and do not extend along a region on which the light source is assembled.

10. The liquid crystal display of claim 1, wherein the first side wall is continuous along four edges of the base.

11. The liquid crystal display of claim 1, wherein the mold frame has a thickness ranging from about 0.3 mm to about 1.0 mm.

12. The liquid crystal display of claim 11, wherein, the second side wall has a height substantially corresponding to the thickness of the liquid crystal display panel.

13. The liquid crystal display of claim 1, wherein the bezel has a thickness ranging from about 0.1 mm to about 0.3 mm.

14. The liquid crystal display of claim 1, wherein the bezel is a double drawing processed bezel.

15. The liquid crystal display of claim 1, wherein the back light unit further comprises a reflection sheet between the light guide plate and the mold frame and seated in the mold frame.

16. The liquid crystal display of claim 1, wherein the back light unit further comprises a printed circuit board for electrically coupling the light source and the liquid crystal display panel.

17. The liquid crystal display of claim 1, wherein the back light unit further comprises an optical sheet between the light guide plate and the liquid crystal display panel, and light shielding tape between the optical sheet and the liquid crystal display panel.

18. The liquid crystal display of claim 1, wherein the light source is a light emitting diode.

* * * * *